(12) United States Patent
Haraguchi et al.

(10) Patent No.: US 6,627,348 B1
(45) Date of Patent: Sep. 30, 2003

(54) METHOD FOR PRODUCING RECTANGULAR CELL

(75) Inventors: Kazunori Haraguchi, Osaka (JP); Hiroshi Yoshizawa, Osaka (JP); Takuya Nakashima, Osaka (JP); Takashi Takeuchi, Osaka (JP); Kikuo Senoo, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/582,387

(22) PCT Filed: Oct. 25, 1999

(86) PCT No.: PCT/JP99/05868

§ 371 (c)(1),
(2), (4) Date: Aug. 11, 2000

(87) PCT Pub. No.: WO00/25374

PCT Pub. Date: May 4, 2000

(30) Foreign Application Priority Data

Oct. 27, 1998 (JP) .......................................... 10-304862

(51) Int. Cl.⁷ ................................................. H01M 2/08
(52) U.S. Cl. ....................................... 429/171; 429/174
(58) Field of Search ................................. 429/163, 167, 429/168, 171, 174, 185

(56) References Cited

U.S. PATENT DOCUMENTS

| | | | | |
|---|---|---|---|---|
| 5,830,599 A | * | 11/1998 | Okamoto et al. ........... | 429/163 |
| 6,001,504 A | * | 12/1999 | Batson et al. ................ | 429/163 |
| 6,136,464 A | * | 10/2000 | Wakabe et al. ................ | 429/53 |
| 6,204,635 B1 | * | 3/2001 | Sullivan ........................ | 320/134 |
| 6,268,079 B1 | * | 7/2001 | Inoue et al. ................. | 429/171 |

FOREIGN PATENT DOCUMENTS

| | | |
|---|---|---|
| JP | 57-145265 | 9/1982 |
| JP | 58-10364 | 1/1983 |
| JP | 8-315788 | 11/1996 |
| JP | 8-315789 | 11/1996 |
| JP | 8-315790 | 11/1996 |
| JP | 9-259841 | 10/1997 |
| JP | 10-144268 | 5/1998 |
| JP | 10-202380 | 8/1998 |

OTHER PUBLICATIONS

International Search Report corresponding to application No. PCT/JP99/05868 dated Jan. 11, 2000.

* cited by examiner

Primary Examiner—Randy Gulakowski
Assistant Examiner—M. Wills
(74) Attorney, Agent, or Firm—RatnerPrestia

(57) ABSTRACT

A method for manufacturing a rectangular cell is provided in which a rectangular case containing a power generating element is hermetically sealed by laser welding a sealing plate to an open end of the rectangular case. A sealing plate 2 formed into the same shape as the upper open end of a rectangular case 1 is laid on the upper open end, laser beams 3a to 3d are applied in a downward direction from the horizontal to a line of contact 4 comprising sides "a" to "d" including respective corners "e", and the line of contact 4 is scanned with laser beams 3a to 3d thereby sealing the open end of the case with the sealing plate.

4 Claims, 7 Drawing Sheets

METHOD FOR PRODUCING RECTANGULAR CELL

THIS APPLICATION IS A U.S. NATIONAL PHASE APPLICATION OF PCT INTERNATIONAL APPLICATION PCT/JP99/05868 file date Oct. 25, 1999.

FIELD OF THE TECHNOLOGY

The present invention relates to a method for manufacturing rectangular cells, in particular to a method for manufacturing rectangular cells in which welding method for welding a sealing plate to an open end of a rectangular case containing a power generating element and hermetically sealing it is improved.

BACKGROUND OF THE INVENTION

Rechargeable batteries to be used as a power supply for portable electronic devices are required to have a high energy density as well as a shape with good space-use efficiency to realize lighter weight and smaller size. As a type of batteries to satisfy these requirements, lithium-ion rechargeable batteries using aluminum case are drawing attention. As the lithium-ion rechargeable batteries are required to keep stable hermeticity over a long period because of their construction, an open end of a bottomed rectangular case is sealed by joining a sealing plate on which to form an electrode by laser welding. Compared with other welding methods, this laser welding method has an advantage of having superior working efficiency because of less thermal influence on the electrolyte contained inside the case or on electrically insulating parts.

Prior arts of manufacturing a rectangular cell by laser welding a rectangular case and a sealing plate as disclosed in Japanese Laid-Open Patent Applications No. Hei 8-315788, No. Hei 8-315789, and No. Hei 8-315790 are known. In the manufacturing methods disclosed in these applications, an open end of a rectangular case is hermetically sealed with a sealing plate by fitting the sealing plate into the open end of the rectangular case which is placed with its opening facing upward, and welding them by applying a laser beam in the vertical direction to the part where the rectangular case and the sealing plate are in contact and scanning the contact part with the laser beam.

However, as laser welding is a method for joining surfaces in contact with each other by fusing the portion irradiated with a laser beam, when there is a gap in the portion to be welded, welding defect such as a hole is easy to be caused on that place. Also, in the event a laser beam passing a gap is applied to a separator inside a cell which is weak against heat, though the output power may be weakened due to defocusing, these methods suffer a problem of causing a short circuit of the cell when the separator is burnt. There may also be a case where there is caused a displacement of the surfaces to be joined due to improper way of securing the surfaces to be joined. In such a case, depending on the angle of incidence of the laser beam, the applied laser output power is partially weakened as the beam is obstructed by displaced sealing plate thus resulting in insufficient fusion and making it difficult to secure required welding strength.

Furthermore, when using a rectangular case and a sealing plate formed with a thin sheet material for the purpose of achieving lighter weight and thinner design, and the part of contact of the sealing plate and the rectangular case is welded by applying a laser beam from the side of the upper open end of the rectangular case, there is a risk of molten metal entering into the cell when the amount of fusion has increased. As there is a limit in the precision of processing of the sheet material to be processed into a rectangular case and a sealing plate, even when the amount of fusion is set to an optimum quantity which will not reach inside the cell, a short-circuit may be caused when molten metal spatters to inside the cell in the event fusion reaching inside the cell takes place due to dispersion of precision of processing of thin sheet material.

The present invention has been contrived in view of the above described issues of the prior arts. It is an object of the present invention to enable joining of a rectangular case and a sealing plate by uniformly welding them without thermally affecting inside of the cell and furthermore to provide a method for manufacturing a rectangular cell with which the welding failure during mass production is reduced and productivity is dramatically improved.

SUMMARY OF THE INVENTION

In order to achieve the above object, the manufacturing method in accordance with the present invention is, in a method for manufacturing a rectangular cell in which a power generating element is contained in a bottomed rectangular cylindrical case with its upper open end formed into a shape having four straight sides and curved corners of a predetermined radius, and the upper open end of the rectangular case is sealed with a sealing plate by laser welding the sealing plate to the upper open end of the rectangular case, to make the sealing plate formed into the shape of the upper open end come in contact with the upper open end of the rectangular case, irradiate the line of contact of the rectangular case and the sealing plate with a laser beam from the side of the rectangular case in a slantingly downward direction, and weld the rectangular case and the sealing plate together by scanning the line of contact with the laser beam. In doing this, it is preferable that the outer dimension of at least either of the longer sides or the shorter sides of the sealing plate is made shorter than the outer dimension of the upper open end of the bottomed rectangular cylindrical case.

It is also preferable to form the sealing plate into the shape of the upper open end of the bottomed rectangular cylindrical case as well as to form a recessed portion which will fit into the upper open end of the rectangular case, make the rectangular case and the sealing plate come in contact with each other with the recessed portion fitted into the upper open end of the rectangular case, and apply a laser beam to the line of contact of the rectangular case and the periphery of the sealing plate from the side of the rectangular case in a slantingly downward direction. The angle of incidence of the laser beam is preferably in the range 5 to 45 degrees from the normal to the side of the case.

With this manufacturing method, as a laser beam is applied sideways of the cell case, the problem that the beam passing a gap in the surfaces to be joined directly impinges on and burns the separator can be solved. By making the outer dimension of the longer sides and the shorter sides of the sealing plate shorter than that of the upper open end of the rectangular case, and applying the laser beam from the side of the rectangular case in a slantingly downward direction, it is possible in mass production to precisely put together the surfaces of the sealing plate and the case to be joined as well as to remove any part that obstructs the laser beam, thereby improving the welding reliability.

Furthermore, by making the sealing plate come in contact with the upper end of the rectangular case by fitting the recessed portion formed on the sealing plate into the upper open end of the rectangular case, inside of the line of contact along which the rectangular case and the sealing plate come in contact with each other on the outer periphery is closed by the recessed portion thus preventing sputters from entering inside the cell when welding by scanning the line of contact with a laser beam from the side of the rectangular case.

Also, in the event the amount of fusion due to laser welding exceeds the sheet metal thickness of the rectangular case, entering inside the cell of molten metal due to fusion can be prevented as the amount of fusion in excess of the sheet material thickness reaches the recessed portion.

DESCRIPTION OF THE PREFERRED EMBODIMENTS

Referring to the attached drawings, a description of an exemplary embodiment of the present invention will be given in the following to aid understanding of the present invention.

Figure 1:
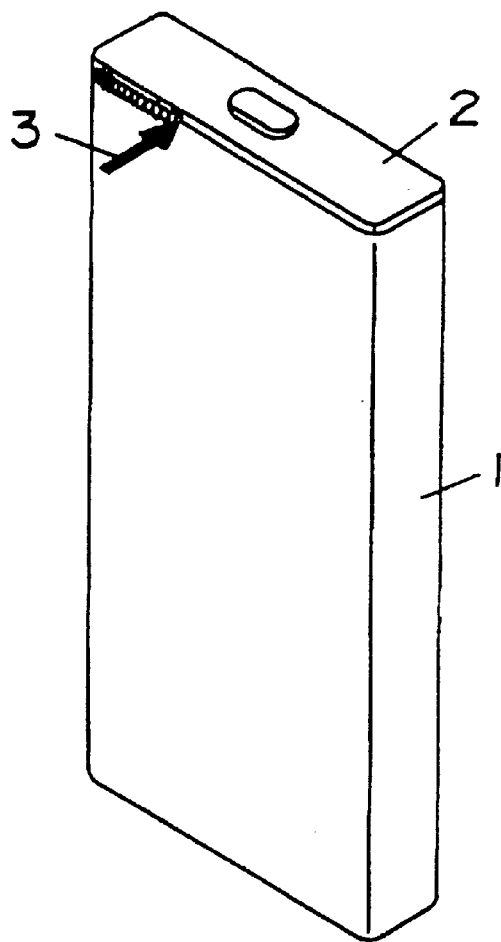
FIG. 1 is a perspective view of a rectangular cell of the present invention.
Figure 2:
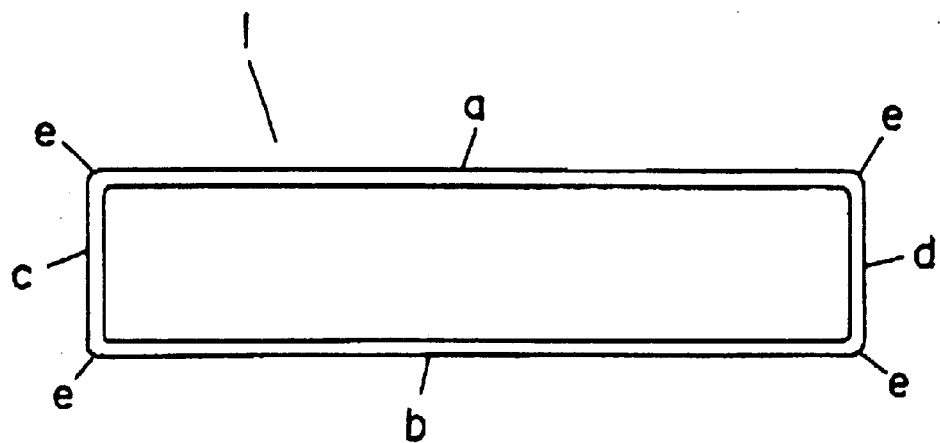
FIG. 2 is a plan view of an open end of a rectangular case of the cell.

FIG. 1 is an external appearance of a rectangular cell in an exemplary embodiment of the present invention. Here, a rectangular cell is fabricated by hermetically sealing inside of a rectangular case 1 by welding a sealing plate 2 to an open end of the rectangular case 1 containing a power generating element. The rectangular case 1 is formed into a four-sided bottomed cylinder with its open end shaped in a manner such that the longer sides "a" and "b" and the shorter sides "c" and "d" are straight lines and each of the corners "e" is curved with a predetermined radius as illustrated in FIG. 2. As the sealing plate 2 is formed into the same external shape as that of the open end of the rectangular case 1, the open end of the rectangular case 1 can be hermetically sealed by laying the sealing plate 2 on top of the open end of the rectangular case 1 and laser welding the line of contact formed by connecting the straight lines "a" to "d" of each side with curved corners "e". In the following, a description will be given on the method for welding the open end of the rectangular case 1 and the sealing plate 2.

Figure 3A:
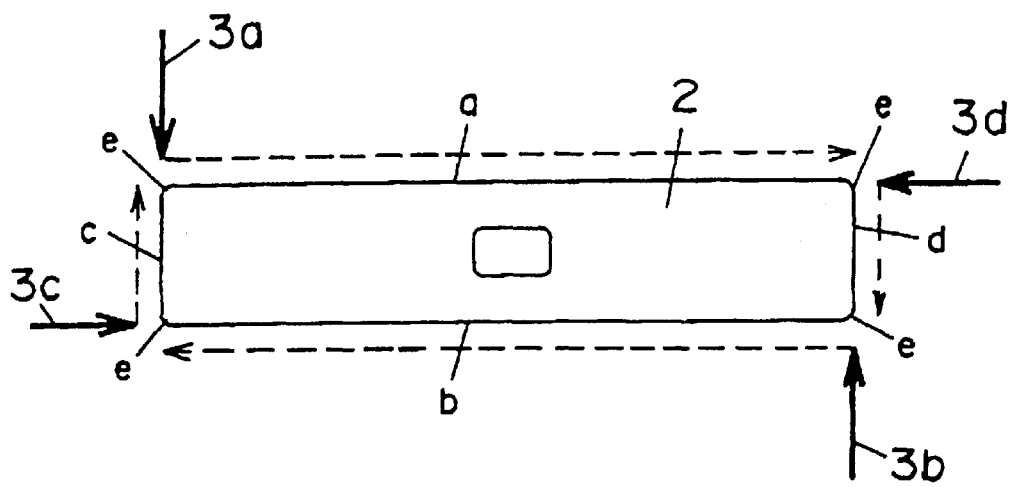
FIG. 3A, is a plan view illustrating directions of a laser beam scanning along line of contact on each side.
Figure 3B:
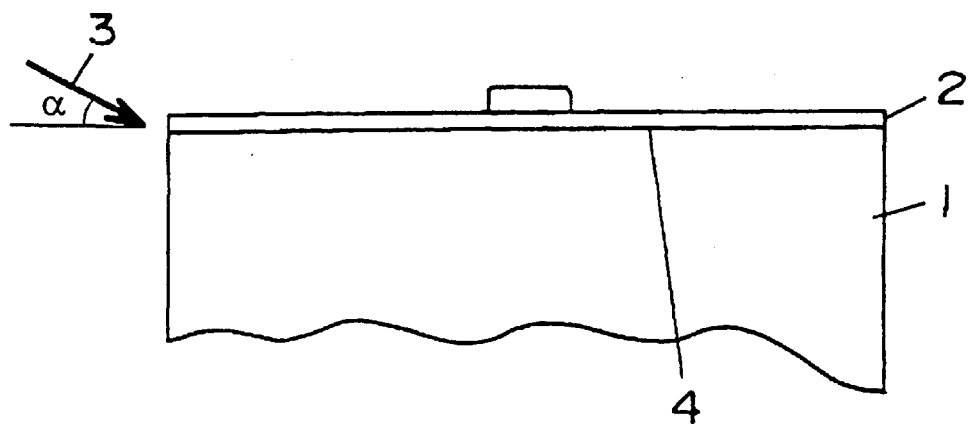
FIG. 3B is a side view illustrating direction of incidence of the laser beam to the line of contact.

FIG. 3A is a top view of the rectangular case 1 placed at a predetermined position with its open end facing vertically upward and with the sealing plate 2 laid to cover the open end. As illustrated in FIG. 3B, laser beams 3a to 3d are applied to the line of contact 4 between the rectangular case 1 and the sealing plate 2, and each of the laser beams 3a to 3d is scanned respectively in parallel to the longer sides "a" and "b" and shorter sides "c" and "d" to weld the line of contact 4 thereby hermetically sealing the open end of the rectangular case 1 with the sealing plate 2. As the direction of scanning by each of the laser beams 3a to 3d is a straight line along each of the sides "a" to "d" as described above, control of the movement is easy, enabling precise welding operation. Also, as illustrated in FIG. 3B, the direction of application of the laser beam 3 to scan the line of contact 4 is a slantingly downward direction with an angle a from the line of contact 4 which is in the horizontal direction.

Figure 4A:
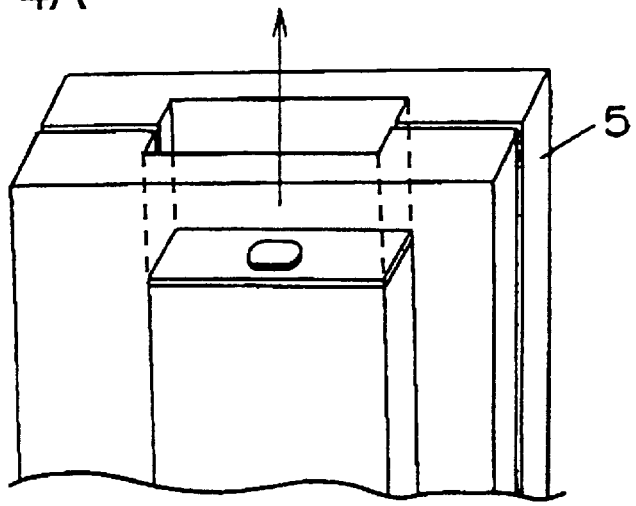
FIG. 4A is a diagram illustrating alignment of the cell case and a sealing plate using a split-type fixing jig.
Figure 4B:
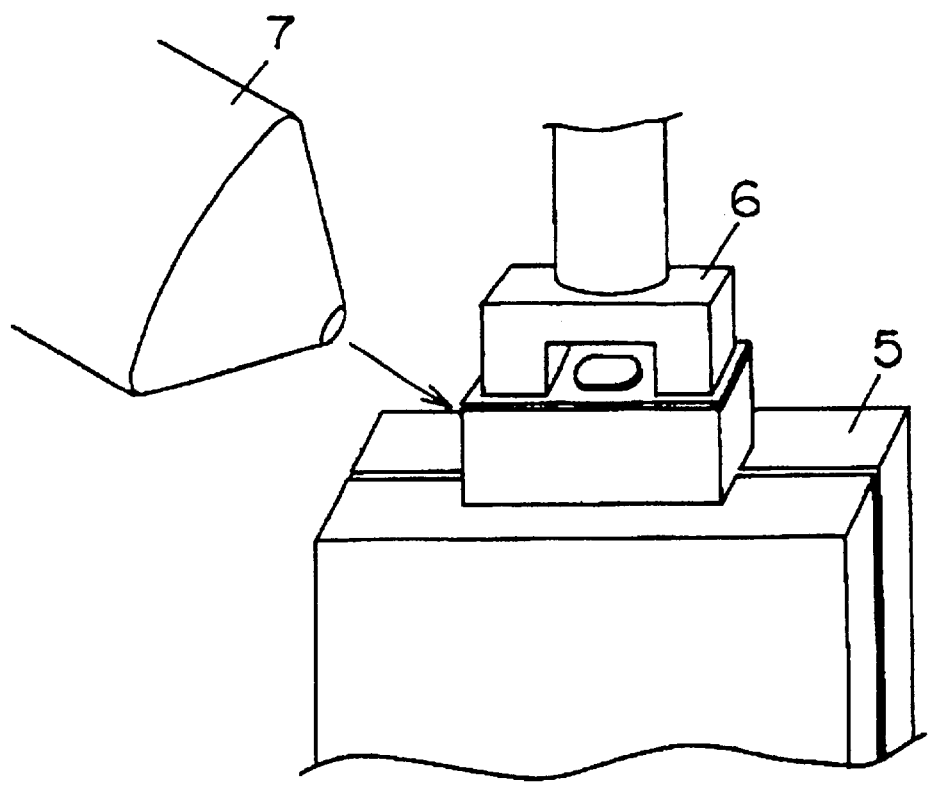
FIG. 4B is a diagram illustrating laser welding using the jig.

Next, advantages of irradiating the line of contact 4 with each of the laser beams 3a to 3d in a downward direction with an incident angle a from the horizontal will be described. FIG. 4A and FIG. 4B are schematic illustrations of the methods to be employed in actual mass production line of rectangular cells for relative positioning of the sealing plate and the case and for securing the cell for laser welding. Prior to laser welding the line of contact 4 of the sealing plate and the case, it is necessary to precisely put one on top of the other along the line of contact. While various methods of alignment are available, simple and fast one is preferable from the standpoint of mass production.

The use of a split-type fixing jig as illustrated in FIG. 4A enables definition of the position to which a laser beam is to be applied with ease and at a high speed by simultaneously inserting a case and a sealing plate into the jig and fastening the jig. Subsequently, the case and the sealing plate are pressed vertically and secured. This is for the purpose of preventing welding failure due to any gap remaining in the line of contact.

After these operations, the entire cell is sledded in the direction of the arrow in FIG. 4A to expose the line of contact out of the jig to allow laser welding. In doing this, in order to secure the entire body, it is preferable to keep lower part of the case within the jig rather than to take the entire cell out of the jig.

FIG. 4B is an illustration of the above described situation. Numeral 5 is the split-type fixing jig and numeral 6 is a jig for pressing the sealing plate. In this mechanical arrangement, as it is not good to make the focal length extremely long, it is difficult to position a bulky laser radiating head just beside the arrangement. In view of the mechanical layout space, it is advantageous to adopt an arrangement illustrated in FIG. 4B.

Especially when aluminum is used as the material for the case and the sealing plate, a higher laser output is required. As the laser head becomes larger with increasing laser output, the welding machine can be positioned only in the way illustrated in FIG. 4B. Mostly for the above reasons, it is possible to increase productivity of cell manufacturing while reducing welding failure by applying each of the laser beams 3a to 3d to the line of contact 4 in a downward direction at an incident angle a from the horizontal.

By operating four laser beams 3a to 3d along straight lines respectively in parallel to the longer sides "a" and "b", and shorter sides "c" and "d", laser welding of the sides "a", "b", "c", and "d" including each of the corners "e" can be simultaneously progressed, thus enabling efficient welding without suffering any displacement of the sealing plate 2 even without temporarily fixing the sealing plate 2 laid on the rectangular case 1.

Furthermore, opposing two sides, for example shorter sides "c" and "d" including respective corners "e", may be simultaneously welded, followed by simultaneously welding remaining two sides and respective corners. In addition, by temporarily fixing the sealing plate 2 on the rectangular case 1 to keep their relative positions unchanged, sequential welding may be performed starting from an arbitrary side including a corner "e".

Next, a description of the advantages of making outer dimension of at least either of the longer sides or the shorter sides of the sealing plate shorter than the outer dimension of the upper open end of the rectangular case will be given. There are two advantages: one being advantage in defining the line of contact using a split jig as illustrated in FIG. 4A, and the other being a dramatic increase in welding reliability by making the laser incident angle downward by an angle a.

The first advantage will be described first. For the purpose of precisely aligning the surfaces to be joined of the sealing plate and the case, a split jig illustrated in FIG. 4A is employed, which is fastened to ensure positioning of each component.

In doing this, if the outer dimension of the sealing plate is greater than the outer dimension of the case, when the split jig is fastened to the sides of the case, the sealing plate Is inevitably either slanted or deformed inside the split jig as it can not keep horizontal position. Furthermore, when exposing the surface to be welded to above the split jig by sliding the case upward based on the sides of the case, inconvenience may be experienced such as the sealing plate being cut or deformed because the case may not be smoothly sledded.

While it is normally preferable that the outer dimensions of the sealing plate and the case be the same, there is a possibility in view of the precision of processing of the metal used that the seal plate be made larger though the designed dimensions are the same. Consequently, taking precision of processing into account, it is advantageous to design the outer dimension of the sealing plate to be no greater than the case even when largest possible sealing plate is made.

Figure 5A:
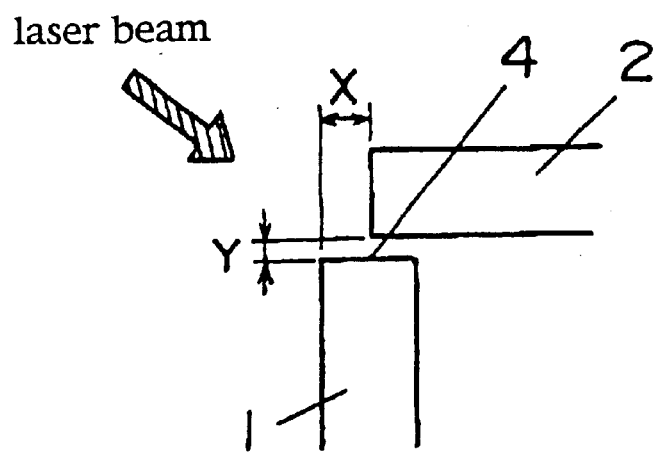
FIG. 5A is a diagram illustrating the relation between deviation of the sealing plate from the cell case and the direction of incidence of laser beam.
Figure 5B:
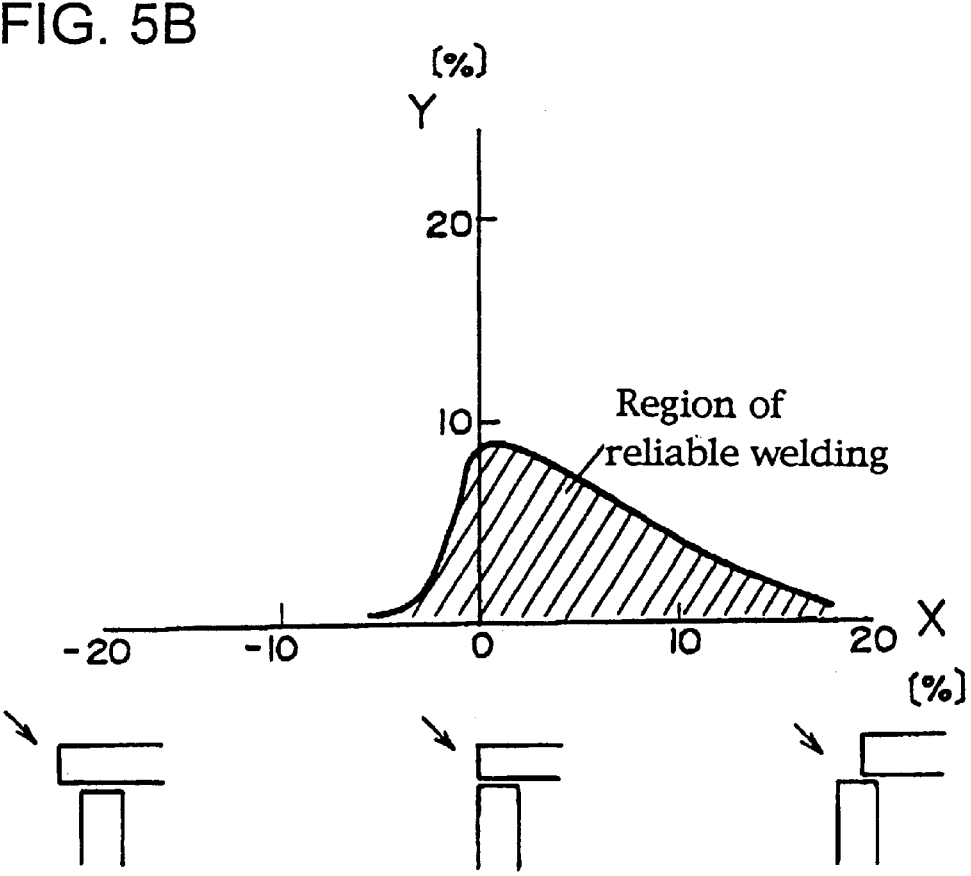
FIG. 5B is a diagram illustrating the relation between deviation of the sealing plate from the cell case and laser weldability.

Next, the second advantage will be described. As laser welding is a method for fusing the portions irradiated with a laser beam and joining the surfaces in contact with each other, it is extremely susceptible to welding failure such as a hole being made when there is a gap in the portions to be welded. Also, there may have been caused displacement of the surfaces to be joined due to improper way of securing them. In such a case, depending on the incident angle of the laser beam, the laser beam may be partially obstructed by a projected portion of the sealing plate due to displacement and the applied laser power output partially weakened thus being unable to provide required degree of fusion and resulting in inability to secure required welding strength. In order to confirm this phenomenon, the relation between the gap and displacement between the sealing plate and the case, and laser weldability was measured. FIG. 5 shows the results obtained. In FIG. 5A and FIG. 5B, the X-axis represents the displacement between the case 1 and the sealing plate 2, and the Y-axis represents the size of the gap. A laser beam was applied from the direction as illustrated in FIG. 5A (slanted 15 degrees downward from the horizontal). In FIG. 5B, the part on the right of the graph (positive values of X) represents the case where the sealing plate is recessed from the outer end of the case, while the part on the left (negative values of X) represents the case where the sealing plate is projecting from the case. Upper part of the graph (large values of Y) represents the direction of increasing gap.

Furthermore, in FIG. 5B, the percentage figures along the axes represent displacement (X) and gap (Y) of the sealing plate relative to the thickness of the sealing plate. Based on welding tests performed on intentionally prepared samples with various values of displacement and gap, the hatched region of the graph is found to be the region in which welding can be securely performed.

It is evident from the graph that the optimum region suddenly narrows as the value of X goes to negative. This is considered to have been caused by the line of contact 4 to be welded being obstructed by the sealing plate projecting from the case thus the laser beam being partially cut-off. Consequently, it is advantageous that the outer dimension of the sealing plate be smaller than the outer dimension of the case.

Now, regarding the laser beam incident angle, although the angle was 15 degrees from the horizontal in this exemplary embodiment, conditions of reliable welding can be found down to 5 degrees from the horizontal depending on the shape of the split jig and the method of securing. Conversely, when the angle exceeds 45 degrees from the horizontal, irradiation tends to be more from above thus naturally greatly losing original advantages of irradiating from the side.

Figure 6:
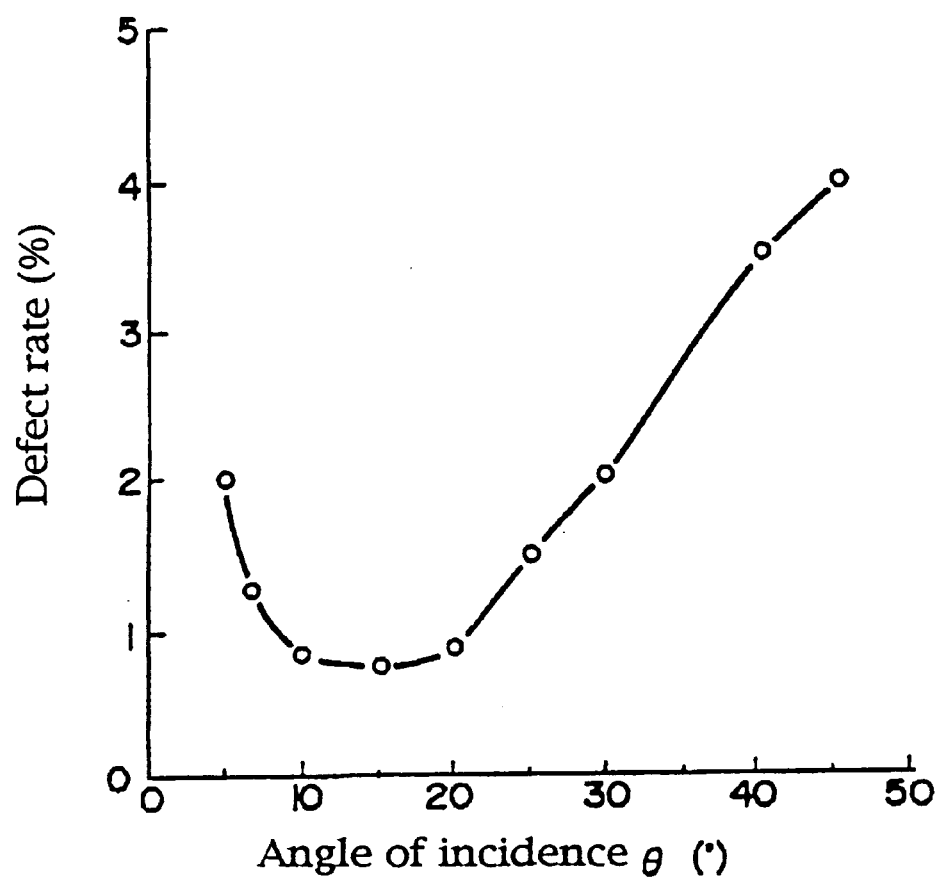
FIG. 6 is a graph showing the relation between the incident angle of laser beam and failure rate of welding.

As a result, it was found from various experiments that an incident angle range of 5 to 45 degrees is preferable, and a range of 7 to 25 degrees is especially preferable (ref. FIG. 6). FIG. 6 shows the change of failure rate of laser welding as a function of the incident angle.

Figure 7:
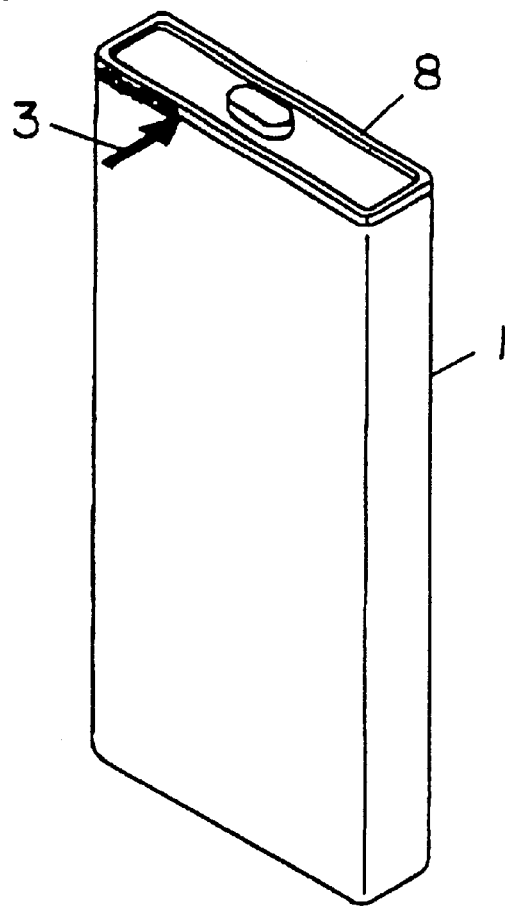
FIG. 7 is a perspective view of another example of a rectangular cell of the present invention.
Figure 8:
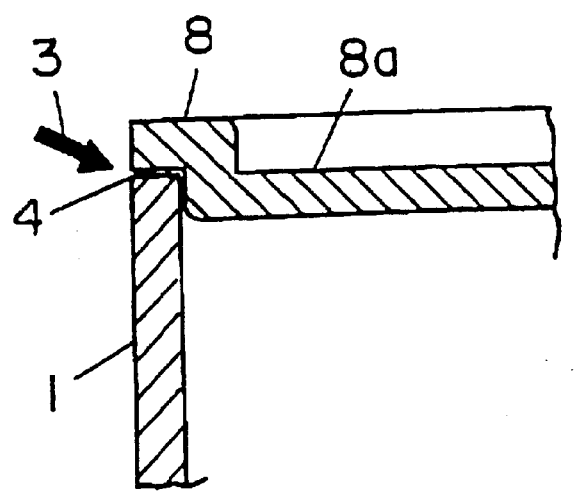
FIG. 8 is a partial cross-sectional view illustrating construction of a sealing plate on which fitting portion has been formed.

Next, a description will be given on the advantages of providing a recessed portion on the sealing plate which fits in the upper open end of the rectangular case. The rectangular cell shown in FIG. 7 is so constructed that a rectangular case 1 is hermetically sealed by laser welding a sealing plate 8 on which a fitting portion for fitting in the open end of the rectangular case 1 has been formed to the open end to be sealed. On the sealing plate 8, a fitting portion (recessed portion) 8a that fits in the open end of the rectangular case 1 is provided as illustrated in the partial cross-sectional view in FIG. 8. When welding the line of contact 4 along which the rectangular case 1 and the sealing plate 8 come in contact by application of a laser beam 3 from the side of the rectangular case 1 as illustrated in the diagram, as the portion inside the line of contact 4 is closed by the recess 8a, sputters of molten metal will not spatter into the cell even in the event a gap exists on the line of contact 4 due to processing error or the amount of fusion exceeds the thickness of the sheet material of the rectangular case 1. Laser welding is performed by scanning the line of contact 4 with laser beams 3a to 3d in parallel to the straight lines of sides "a", "b", "c", and "d" illustrated in FIG. 3A similar to what has been described before. The direction of application of the laser beam 3 was slanted downward by 15 degrees from the horizontal as illustrated in FIG. 8.

Figure 9:
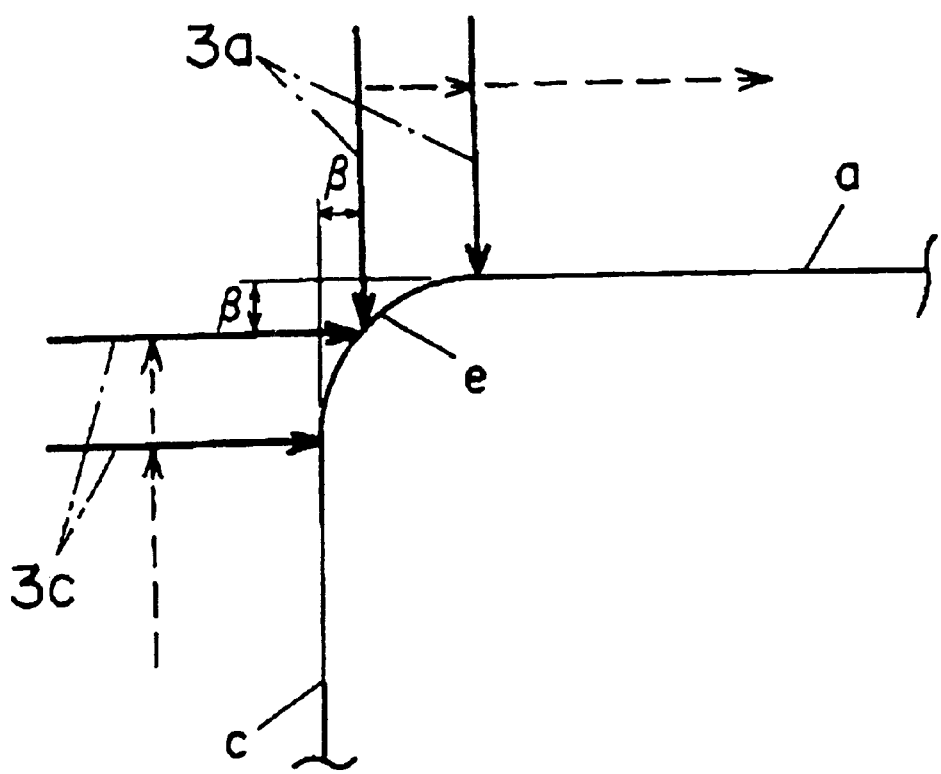
FIG. 9 is a diagram illustrating difference in focal length of a laser beam at corners.

In the above described exemplary embodiment, when scanning the laser beam 3 in parallel to each of the sides "a", "b", "c", and "d", the position of the focal point of the laser beam 3 becomes far at each of the curved corners "e" thus making the welding ability of the laser beam lowered. In other words, taking the laser beam 3a in FIG. 9 as an example, the scan starting position is on the curve of the corner "e", where a maximum focal length difference of β exists with respect to the position of scanning the longer side "a". Same situation applies to the scan ending position.

Taking the laser beam 3c as an example, it has a maximum focal length difference of β with respect to the position of scanning the shorter side "c". The decrease of welding strength at the corners "e" due to the difference β in distance can be remedied by the following welding methods. One of the methods is to change the laser output at the position where the laser beams 3a to 3d scan respective corners "e" in correspondence to the difference in distance from each of the sides "a" to "d". In other words, as the reduction in welding ability at a corner "e" where the position of the focal point is far can be compensated by an increase in the laser output, a uniform welding can be performed over the entire line of contact 4.

A second method is to change the interval of radiating laser pulses in accordance with the difference in distance from each of the sides "a" to "d" at the position where respective laser beams 3a to 3d scan a corner "e". To be more specific, as the difference in distance increases, the laser pulse radiating interval is shortened, and in the direction in which the difference in distance decreases, the laser pulse radiating interval is made longer. As the difference in distance can be compensated by the amount of irradiation per unit time by the laser beam 3 by changing the laser pulse radiating interval, uniform welding can be performed over the entire line of contact

INDUSTRIAL APPLICATION

According to the present invention, as a laser beam is applied from the side of a rectangular case to a line of contact on which a sealing plate formed into the same shape as the outside shape of the upper open end of the rectangular case is made to come in contact with the upper open end of the rectangular case, the problem of a separator being directly exposed to the laser beam passing a gap on the surfaces to be joined and is burnt can be solved. By making the outer dimension of the longer sides and the shorter sides of the sealing plate shorter than the outer dimension of the upper open end of the rectangular case, and applying a laser beam from the side of the rectangular case in a slantingly downward direction, surfaces to be joined of the sealing plate and the case can be precisely aligned during mass production while being able to eliminate portions that obstruct the laser beam thus improving welding reliability. Furthermore, by making the sealing plate come in contact with the upper open end of the rectangular case by fitting a recessed portion formed on the sealing plate into the upper open end of the rectangular case, inside of the line of contact on which the rectangular case and the sealing plate come in contact on the outer peripheral can be closed by the recessed portion thereby preventing sputters produced while welding by scanning the line of contact with a laser beam from the side of the rectangular case from entering inside the cell. Also, in the event the amount of fusion due to laser welding exceeds the thickness of the sheet material of the rectangular case, entering of molten metal into the cell can be prevented as the fusion beyond the sheet material thickness reaches the recessed portion.

What is claimed is:

1. A method for manufacturing a rectangular cell, said method comprising the steps of:

housing a power generator element inside a bottomed rectangular metal case with its upper open end formed into an opening having four sides of a rectangle consisting of straight lines and curved corners with a predetermined radius, placing a sealing plate on top of said rectangular metal case so that said sealing plate overlaps top edges of sidewalls of said case, and sealing the upper open end of the rectangular metal case with said sealing plate by laser welding the sealing plate to the upper open end of the rectangular metal case, wherein the sealing plate formed into the shape of the upper open end is made to come in contact with the upper open end of the rectangular metal case and wherein the line of contact between the upper open end of the rectangular metal case and the sealing plate faces toward the side of the rectangular metal case, a laser beam is applied to the line of contact of the rectangular metal case and the sealing plate from the side of the rectangular metal case in a slantingly downward direction, and the laser beam scans the line of contact, thereby to weld the rectangular metal case and the sealing plate.

2. The method for manufacturing a rectangular cell of claim 1, wherein the outer dimension of at least either of the longer sides or the shorter sides of the sealing plate is made shorter than the outer dimension of the upper open end of the bottomed rectangular cylindrical metal case.

3. The method for manufacturing a rectangular cell of claim 1, wherein the sealing plate is formed into the shape of an upper open end of a bottomed rectangular cylindrical metal case while a recessed portion to fit into the upper open end of the rectangular metal case is formed on said sealing plate, the rectangular metal case and the sealing plate are made to come in contact in a state in which said recessed portion is fitted in the upper open end of the rectangular metal case, and a laser beam is applied to the line of contact of the rectangular metal case and the periphery of the sealing plate from the side of the rectangular metal case in a slantingly downward direction.

4. The method for manufacturing a rectangular cell of claim 1, wherein the laser beam to be applied from the side of the rectangular metal case in a slantingly downward direction has an incident angle in a range 5 to 45 degrees from the normal to the side of the metal case.

\* \* \* \* \*